United States Patent [19]

Searle

[11] 4,199,017
[45] Apr. 22, 1980

[54] TIRE REMOVAL APPARATUS
[75] Inventor: Eric H. Searle, Sutton Coldfield, England
[73] Assignee: Dunlop Limited, England
[21] Appl. No.: 872,313
[22] Filed: Jan. 25, 1978
[30] Foreign Application Priority Data
  Jan. 25, 1977 [GB] United Kingdom ............... 2884/77
[51] Int. Cl.² ............................................. B60C 25/00
[52] U.S. Cl. ................................... 157/1.1; 157/1.17
[58] Field of Search ............... 29/254, 255; 81/53.3, 81/52.35; 157/1.1, 1.17, 1.2, 1.26

[56] References Cited
U.S. PATENT DOCUMENTS

| | | | |
|---|---|---|---|
| 2,331,167 | 10/1943 | Brecht et al. ........................... | 29/254 |
| 2,778,098 | 1/1957 | Jamieson et al. ....................... | 29/254 |
| 2,801,684 | 8/1957 | Salsbury ................................. | 157/1.17 |
| 3,058,295 | 10/1962 | Temple et al. ......................... | 29/254 X |
| 3,157,498 | 11/1964 | Zernow et al. ........................ | 29/254 X |
| 3,537,501 | 11/1970 | Johnson ................................ | 157/1.17 |
| 3,648,751 | 3/1972 | Archidoit .............................. | 157/1.17 |
| 3,667,530 | 6/1972 | Gray ..................................... | 157/1.26 |
| 3,948,306 | 4/1976 | Marshall ................................ | 157/1.26 |

*Primary Examiner*—James G. Smith
*Attorney, Agent, or Firm*—Stevens, Davis, Miller & Mosher

[57] ABSTRACT

A method of dislodging a pneumatic tire from its bead seat of a wheel rim on which it is fitted, by applying a force to the tire, said force having been generated by the detonation of an explosive charge.

6 Claims, 5 Drawing Figures

TIRE REMOVAL APPARATUS

This invention relates to method and apparatus for removing or otherwise dislodging tires from wheel rims and in particular to the bead dislodging sometimes known as "bead-breaking".

Operators are called upon to remove tires by the roadside, and various mechanical devices are known to assist in bead dislodging. However, particularly after long usage of the tire to be released, great force may be needed and known devices may be unable, or at least be very inefficient and slow, to dislodge the bead.

In a first aspect the invention provides a method of dislodging a pneumatic tire from its bead seat of a wheel rim on which it is fitted, by applying a force to the tire, said force having been generated by the detonation of an explosive charge.

The dislodging of the tire beads from the bead seats can, for example, be by utilizing the force generated by the explosive charge to apply a force axially and radially inwardly of the tire bead.

It is preferred that the explosive charge should be used in such a way as to obtain a direction of as large a proportion as possible of the force of detonation towards the tire, thereby obtaining efficient use of the explosive charge and limiting the extent to which the detonation is experienced beyond the immediate vicinity of the tire. The said direction can be obtained, for example, by use of a hollow or other shaped explosive charge, use of suitable tamping or screening or other enclosure means for the charge and/or use of a force-transmitting member. In the last-mentioned case in particular the detonation can be effected beyond the immediate vicinity of the tire.

The force generated by said detonation can be applied to the tire by various means. For example, it can be applied by transmission through a tool interposed between the explosive charge and the tire, or it can be applied by allowing the shock waves from the detonation to act on the tire either directly or through air, water or some other fluid medium. Where the shock waves are allowed to act on the tire without the use of an interposed tool the detonation is preferably effected adjacent the tire.

In one form of the method of the invention the tire is immersed in a fluid medium capable of absorbing shock waves from the detonation and the explosive charge is detonated adjacent the tire, for example in contact with a sidewall of the tire. The fluid medium, which is preferably water though other substances such as sand can be used, acts to tamp the explosive charge and thereby to prevent undesirable effects of the detonation being experienced beyond the immediate vicinity of the tire.

The water or other fluid medium is conveniently held in a container large enough to hold the tire and associated wheel in a horizontal position, the tire and wheel being covered by an adequate depth of the fluid.

In accordance with the foregoing disclosure, the invention in a second aspect provides apparatus suitable for use in the method of the invention, which comprises a container to accommodate both the tire and its associated wheel rim and said fluid medium; means to support the tire and its wheel rim within the container; means to locate the explosive charge adjacent the tire; and means to detonate the explosive charge.

In another form of the method of the invention a tool can be used to apply the force of detonation, the tool being in the form of a gun which, using the force of the detonation, "fires" a tool which can be directed towards the appropriate region of the tire. The tool is preferably such that when "fired" it is not ejected completely from the gun.

The gun can, for example, be in the form of a pistol having a barrel which accommodates the spigot tool, and the explosive charge is in the form of a heavy duty cartridge fired, for example, by means of a firing pin acting on a percussion cap in the cartridge.

The gun can, for example, be one fired in the hand, the direction of the "fired" tool being judged by the eye. In another form, there is a frame or other support to hold both the gun and tire on its wheel in a suitable disposition to each other so that, after any adjustment that may be necessary, the tool can be "fired" at the appropriate region of the tire.

Good results in dislodging the tire from its bead seat can be obtained by applying the force of detonation to one or more regions of a sidewall of the tire adjacent the bead of said sidewall. The force can be applied to said region or regions by detonating the charge (or two or more portions of the charge, as the case may be) so that the resulting shock waves act directly on the tire in said region or regions. Alternatively, a reaction member or body or other tool can be interposed between the explosive charge and the tire. The shape of this tool depends to a large extent on where it is wished to apply the force of detonation; for example whether to apply the force to one or more regions of the tire. If it is intended to apply the force to an annular region of the tire sidewall, a tool of arcuate shape and of dimensions appropriate to the radius of the tire can be used. Where it is intended to apply the force to the whole of said annular region, an annular plate or other ring of appropriate dimension can be used, the ring being placed so as to cover said annular region. Preferably, in the latter instance, several spaced-apart explosive charges are detonated immediately above said ring.

Detonation of the explosive charge can be by any convenient technique which will readily be apparent to those skilled in the art. For example, it can be effected by use of an electrically actuated detonator inserted in the charge. A suitable electric current can be provided by use of a generator of the dynamo-condenser type.

In order to facilitate accurate and speedy location of the explosive charge or charges with respect to the tire, it is convenient to use a carrier to which the charges are attached. For example, the charges can be secured by tape or other means at several places to an annular or other circular carrier. Choice of a suitable diameter for the carrier permits it readily to be aligned with the tire prior to detonation.

Such interposed ring or other arcuate body can have one or more projections extending transversely therefrom to concentrate the force on to one or more respective particular areas of said region or regions. Such projections are conveniently transverse to the plane containing the ring or other arcuate body. The interposed ring or other arcuate body is conveniently a member that can act as an inertial mass.

Where a hand-held pistol-type tool is utilized it may be loaded with a cartridge, for example a blank shot gun cartridge.

The invention is illustrated by the following description, with reference to the accompanying diagrammatic drawings and by way of example only, of some embodiments of the invention.

Figure 1:
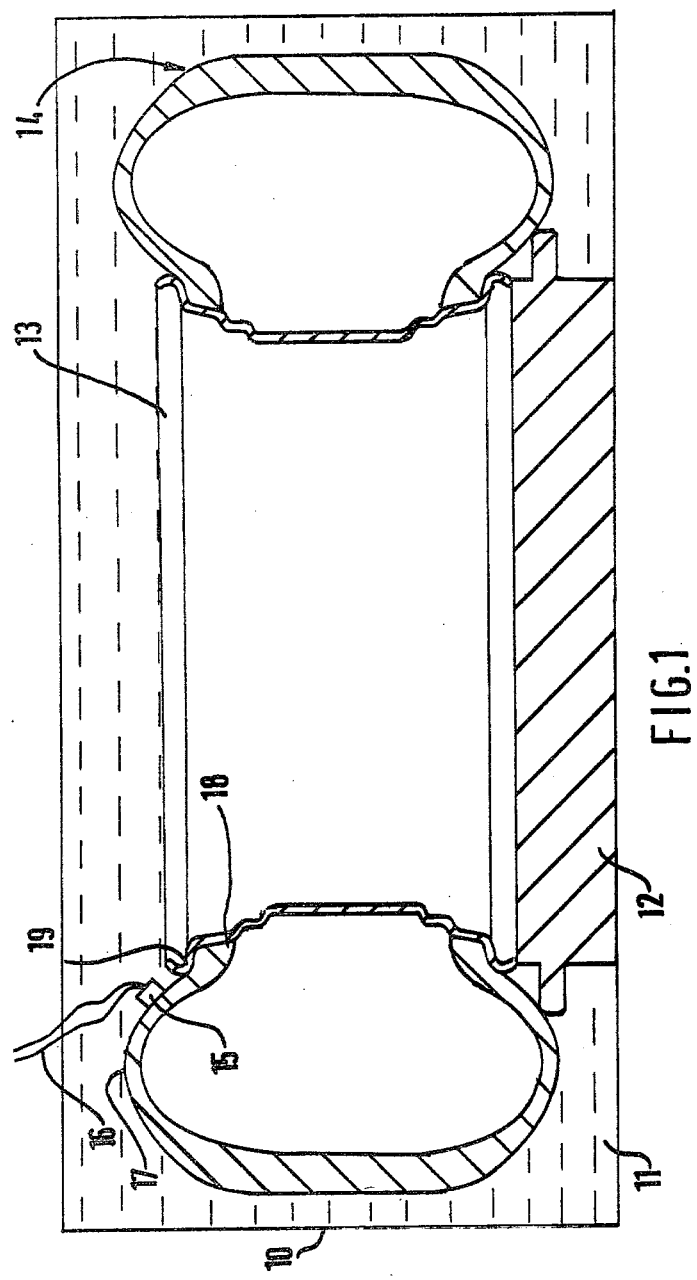
FIG. 1 is a cross-section of a first form of bead dislodgement apparatus according to the present invention, shown in use with an unenclosed explosive charge.

As shown in FIG. 1, a container tank 10 contains water 11 and a wheel-supporting block 12 which is positioned at the bottom of the tank. A wheel 13 fitted with a tire 14 which it is intended to dislodge from the bead seats of the wheel is put in the tank and fastened to the supporting block so that it is well covered by the water. A small point charge 15 of explosive, connected to a detonating system (not shown) by means of leads 16, is attached to the tire side wall 17 adjacent the bead 18 of the tire and flange 19 of the wheel.

When the charge is detonated the volume of water above the wheel and tire provides a reaction member to contain the force of the explosion in the same way as in some explosive forming techniques, and the force directed against the bead of the tire causes dislodgement of the bead from its seat at least in the area of the charge.

Several charges 15 may be used distributed around the tire and conveniently the charge or charges are mounted upon a carrier ring (not shown) so that the operator may conveniently position them around the tire.

Figure 2:
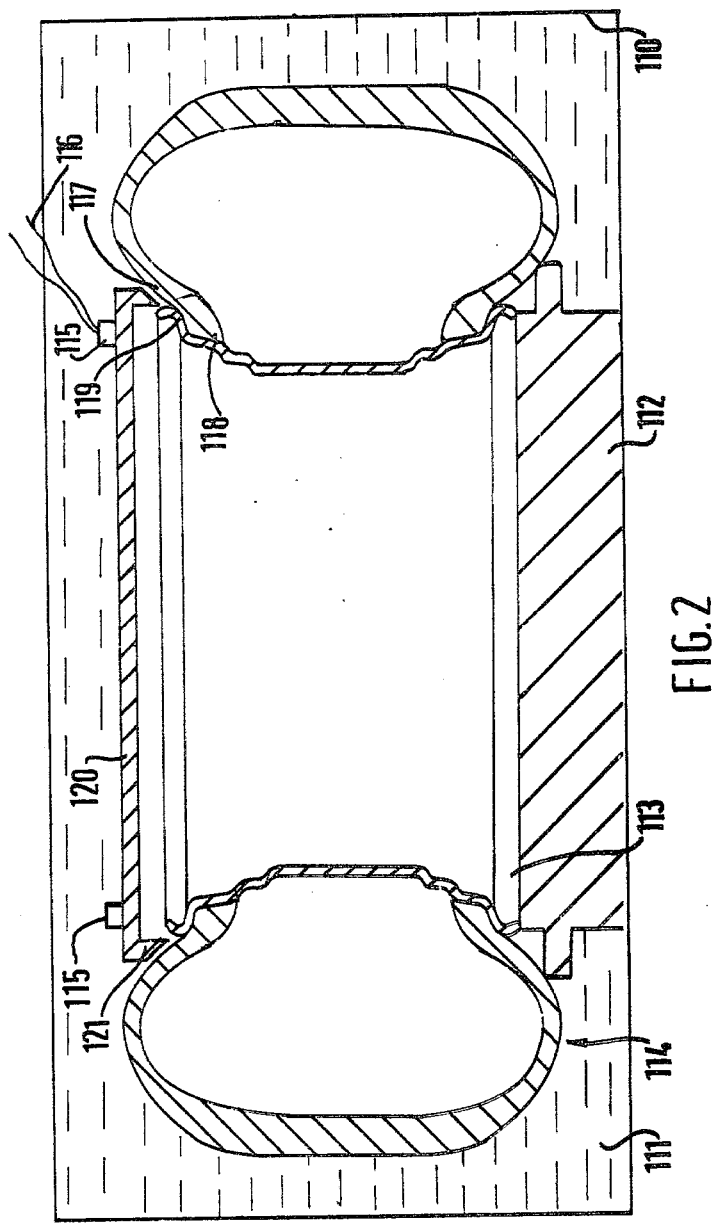
FIG. 2 is a cross-section of a second form of apparatus, similar to that shown in FIG. 1, but including a ring interposed between the tire and the explosive charge to assist in dislodgement of the tire.

In FIG. 2 like parts to those of FIG. 1 are indicated by like reference numerals except that they have the prefix "1". In FIG. 2 the tank 110 contains a wheel support block 112 on which has been placed the wheel 113 fitted with tire 114 which it is intended to dislodge from the bead seat of the wheel rim. The tank is fitted with water 111.

The rigid dislodgement ring 120 having a projection 121 extending transversely of the plane containing the ring is placed upon the tire so that the projection engages between the wheel flange 119 and the sidewall 117 of the tire. The charges 115 are placed upon the ring and when detonated the downward force applied to the ring effects bead dislodgement. One or more points 121 may be provided around the tire depending upon the extent of dislodgement required in a single operation and the explosive force conveniently available.

With reference to FIGS. 1 and 2, the tank 10, 110 may be of any suitable material and may be, for example, a collapsible rubber tank. Furthermore, the water may be substituted by means of sand or any other material which will suitably retain the explosive force so that the force is concentrated in the direction required to dislodge the bead.

The explosive charge 15, 115 may be contained in a small rigid enclosure further to concentrate the force in the direction of the bead/flange interface.

Figure 3:
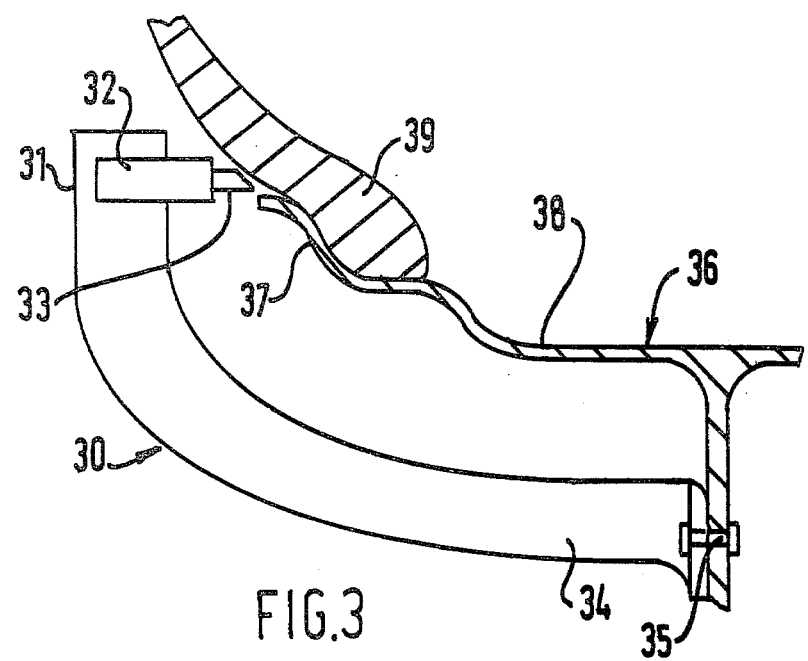
FIG. 3 shows a bead dislodgement apparatus comprising a gun using an enclosed or captive explosive charge to propel a mechanical bead removal tool, and a supporting frame.

The embodiment shown in FIG. 3 comprises a framework 30 to one end portion 31 of which is secured a gun 32 which fires a tool 33. The other end portion 34 of frame 30 carries engagement means 35 by which the frame is secured temporarily to the wheel 36 which carries the tire to be dislodged. The bead removal tool 33 is placed between the flange 37 of the wheel rim 38 and the tire bead 39. The gun 32 is loaded with a small explosive charge provided with detonating means (not shown). The charge and detonating means together can be provided by use of a cartridge. When the captive charge is detonated the generated force causes the bead removal tool to push the tire bead from its bead seat.

Figure 4:
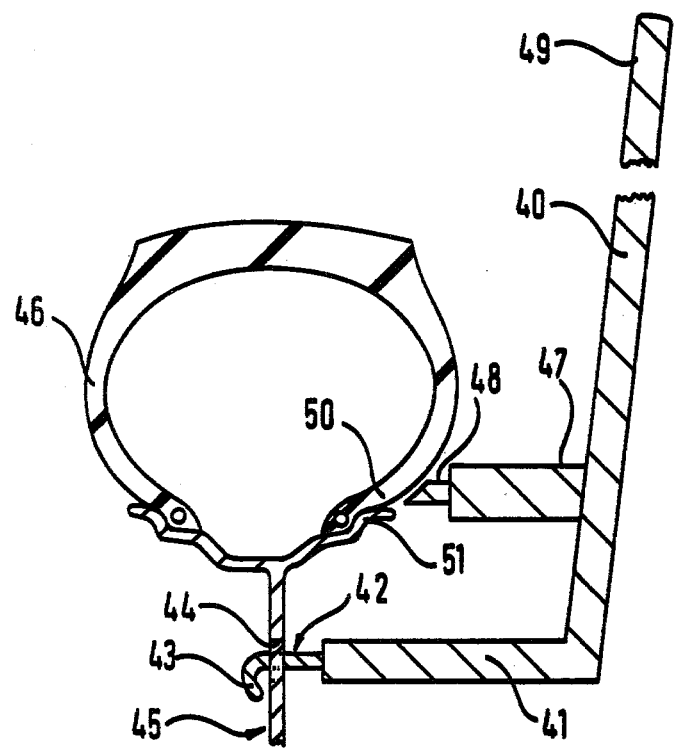
FIG. 4 shows apparatus similar to that of FIG. 3, but in which the gun is supported by a different frame.

In FIG. 4 the frame comprises a reaction or other member 40 formed with an arm 41 which carries a hooked engagement means 42.

The hook 43 of this engagement means is such that it can engage an aperture 44 in wheel hub 45 (said aperture being one of the array in conventional wheel hubs) which carries tire 46 to be dislodged.

Gun 47, which fires tool 48, is carried by the frame at a position between arm 41 and is held by adjustment means (not shown) so that its position along the length of the frame can be adjusted to suit the size of tire to be dislodged.

To dislodge the tire the frame is manipulated so that hook 43 passes through aperture 44 and engages the wheel hub. The position of gun 47 is adjusted to align tool 48 with the region of the tire sidewall 50 and the adjacent wheel flange 51. Lever 40 is then moved so as to press tool 48 into contact with sidewall 50 which firmly engages hook 43 in aperture 44. Since gun 47 is located between handle 49 and arm 41, a mechanical advantage is obtained for the tool 48. The gun is then "fired" thereby propelling tool 48 against tire sidewall 50 and dislodging the associated tire bead from its seat.

Figure 5:
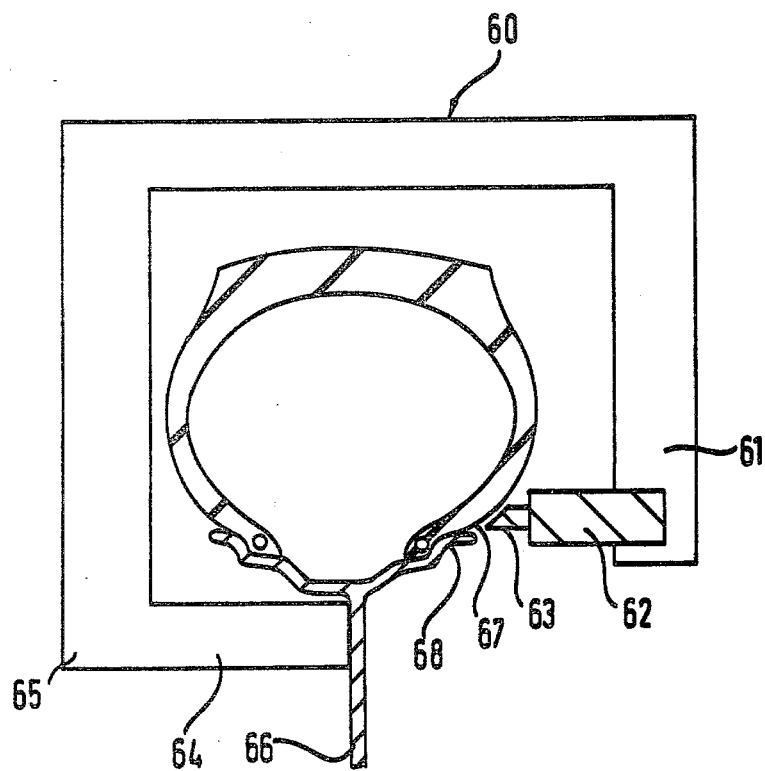
FIG. 5 shows another apparatus comprising a gun and a third form of frame.

In FIG. 5 the bifurcated frame 60 has one arm 61 which carries gun 62 thereon.

The gun is conveniently held by adjustment means (not shown) so that its position along the length of the frame can be adjusted to suit the size of tire to be dislodged. Gun 62 fires tool 63.

The other arm 64 of the frame is crooked at 65 so that the frame, when in position around a tire and wheel assembly, substantially encircles the assembly. The shape and dimensions of arm 64 are such that the arm can abut or engage the hub 66 or other suitable part, e.g., the flange or rim of the wheel on one side thereof while the gun 62 on the other side is aligned with that region of the tire sidewall 67 adjacent wheel flange 68. Preferably tool 63 can then be brought into contact with sidewall 67, and to facilitate this it is convenient to use a frame in which the two arms 61,64 can be adjusted relatively to each other, for example by means of a hinge or other adjustment, preferably by means which can be locked during detonation of the charge.

The use of explosive charges for tire removal provides a very powerful compact source, and substantially higher forces can be provided than hitherto. The invention allows bead dislodgement forces to be applied at more than one point around the tire bead.

Having now described my invention, what I claim is:

1. A method of dislodging a pneumatic tire from a wheel rim on which it is fitted, which comprises locating an explosive charge adjacent said tire; interposing a tool having an arcuate shape with a radius corresponding to the tire between the explosive charge and the tire, in contact with the tire; immersing said tire and wheel in a fluid medium; detonating said charge while in said fluid medium to produce a force against the tire sidewall adjacent the bead sufficient to dislodge said tire but insufficient to damage said tire or said wheel; and controlling the force generated by the detonation to direct a substantial part of said force against the tire.

2. A method according to claim 1, in which said medium is water.

3. A method according to claim 1, in which the explosive charge is in two or more portions spaced apart in said region.

4. A method according to claim 1, in which the arcuate tool is a ring whose inner diameter is greater than that of the wheel rim and whose outer diameter is less than the outer diameter of the tire.

5. Apparatus for use in dislodging a pneumatic tire from a wheel rim comprising a container to accommodate both the tire and its associated wheel rim and a liquid medium; means to support the tire and its wheel rim within the container; means to locate an explosive charge adjacent the tire including a tool in contact with the tire sidewall, said tool being of arcuate shape having a radius such that it can be located adjacent the tire bead; and means to detonate the explosive charge.

6. Apparatus according to claim 5, including a support to carry the explosive charge in several spaced-apart portions, whereby said portions can readily be located with respect to the region or regions of the tire where the force of detonation is to be applied.

* * * * *